United States Patent
Campbell et al.

(10) Patent No.: US 12,243,229 B2
(45) Date of Patent: Mar. 4, 2025

(54) SYSTEMS AND METHODS FOR MONITORING MEDICAL ROOM CLEANING

(71) Applicant: Stryker Corporation, Kalamazoo, MI (US)

(72) Inventors: Dustin Ryan Campbell, Fort Worth, TX (US); Sudhanshu Mehta, Gurdaspur (IN); Avinash Kumar, Bokaro Steel (IN)

(73) Assignee: Stryker Corporation, Portage, MI (US)

( * ) Notice: Subject to any disclaimer, the term of this patent is extended or adjusted under 35 U.S.C. 154(b) by 42 days.

(21) Appl. No.: 18/053,370

(22) Filed: Nov. 7, 2022

(65) Prior Publication Data

US 2023/0143836 A1 May 11, 2023

Related U.S. Application Data

(60) Provisional application No. 63/263,760, filed on Nov. 8, 2021.

(51) Int. Cl.
| | |
|---|---|
| G06T 7/00 | (2017.01) |
| G06T 11/00 | (2006.01) |
| G06V 10/70 | (2022.01) |
| G06V 20/52 | (2022.01) |
| G06V 40/10 | (2022.01) |
| G06V 40/20 | (2022.01) |
| H04N 7/18 | (2006.01) |

(52) U.S. Cl.
CPC ........... *G06T 7/0012* (2013.01); *G06T 11/00* (2013.01); *G06V 10/70* (2022.01); *G06V 20/52* (2022.01);
(Continued)

(58) Field of Classification Search
None
See application file for complete search history.

(56) References Cited

U.S. PATENT DOCUMENTS

2014/0333744 A1* 11/2014 Baym ............... G08B 21/245
   348/77
2019/0117812 A1*  4/2019 Olsen ..................... A61L 2/26
(Continued)

FOREIGN PATENT DOCUMENTS

CN      111568283 A      8/2020
CN      111833999 A     10/2020
(Continued)

OTHER PUBLICATIONS

Narang et al. (Oct. 25, 2018) "Sensitive, Real-time and Non-Intrusive Detection of Concentration and Growth of Pathogenic Bacteria using Microfluidic-Microwave Ring Resonator Biosensor," Scientific Reports 8 (15807); 10 pages.
(Continued)

*Primary Examiner* — Samira Monshi
(74) *Attorney, Agent, or Firm* — Morrison & Foerster LLP

(57) ABSTRACT

A method for monitoring cleaning of a medical room includes: receiving imaging of the medical room, the imaging capturing signatures of cleaning deposits on one or more surfaces of the medical room deposited via a cleaning process; analyzing the imaging to: identify one or more surfaces in the medical room that should be cleaned, and determine which of the one or more surfaces have been cleaned by identifying the signatures of the cleaning deposits; and displaying an indication of at least one of: (1) the surfaces that have been cleaned, and (2) one or more surfaces that have not been cleaned.

27 Claims, 13 Drawing Sheets

(52) U.S. Cl.
CPC ............ *G06V 40/107* (2022.01); *G06V 40/20* (2022.01); *H04N 7/183* (2013.01); *G06T 2207/10048* (2013.01); *G06T 2207/10064* (2013.01); *G06T 2207/20081* (2013.01); *G06T 2207/30232* (2013.01)

(56) References Cited

U.S. PATENT DOCUMENTS

| | | |
|---|---|---|
| 2020/0090089 A1 | 3/2020 | Aston et al. |
| 2020/0143190 A1 | 5/2020 | Hastings et al. |
| 2020/0397224 A1 | 12/2020 | Mirza et al. |

FOREIGN PATENT DOCUMENTS

| | | |
|---|---|---|
| CN | 112230585 A | 1/2021 |
| CN | 112466442 A | 3/2021 |
| WO | 01/45755 A2 | 6/2001 |
| WO | 03/079278 A1 | 9/2003 |

OTHER PUBLICATIONS

Najotra et al. (2017). "Microbiological Surveillance of Operation Theatres: Five Year Retrospective Analysis from a Tertiary Care Hospital in North India," International Journal of Applied & Basic Medical Research 7(3): 9 pages.

\* cited by examiner

SYSTEMS AND METHODS FOR MONITORING MEDICAL ROOM CLEANING

CROSS-REFERENCE TO RELATED APPLICATIONS

This application claims the benefit of U.S. Provisional Application No. 63/263,760, filed Nov. 8, 2021, the entire contents of which are hereby incorporated by reference herein.

FIELD

This disclosure generally relates to medical room monitoring, and more specifically, to monitoring cleaning of a medical room.

BACKGROUND

Operating room cleanliness is important for preventing surgical site infection. After each surgery, cleaning personnel clean surfaces within the operating room, including surfaces of lights, tables, and control interfaces, in preparation for the next surgery. Busy surgery centers seek to reduce the amount of operating room down time to maximize the number of surgeries that can be performed in a day. Often, cleaning personnel have only ten to fifteen minutes to clean an operating room between surgeries. With this kind of time pressure, the chances of human error are not insignificant. Surfaces may be cleaned inadequately or missed altogether. Further, there is typically no way to verify whether all surfaces that should be cleaned have been cleaned, increasing the risk of surgical site infection.

SUMMARY

According to various aspects, systems and methods enable the monitoring of medical room cleaning to ensure that the surfaces of the medical room that should be cleaned between procedures have been cleaned. Imaging of a medical room may be analyzed to detect surfaces within the medical room that should be cleaned and to detect evidence that the surfaces have been cleaned. Notifications may be provided indicating which surfaces have been cleaned and/or still need cleaning. Notifications may be provided within the medical room to the cleaning personnel to assist them in keeping track of cleaning progress. Notifications may be provided to personnel outside of a medical room, for example, to enable monitoring of cleaning progress.

Optionally, detecting evidence that surfaces have been cleaned includes detecting signatures of cleaning on surfaces. Signatures of cleaning can include, for example, deposits left behind by a cleaning substance that are captured in imaging. Optionally, a non-visible light imaging modality may be used to detect the cleaning deposits. For example, a cleaning fluid may include a fluorescing substance that may be deposited on a surface cleaned with the cleaning fluid and a fluorescence imaging system may be used to detect the fluorescence on the cleaned surface. The presence of the fluorescing substance, or a threshold amount of fluorescing substance, on the surface may be used as an indicator that the surface has been cleaned. Signatures of cleaning can additionally or alternatively include moisture remaining on a surface after being cleaned. The moisture can be detected by a suitable imaging modality, such as short-wave infrared imaging.

Optionally, detecting evidence that surfaces have been cleaned includes detecting cleaning behaviors. Imaging may be analyzed to automatically identify cleaning behaviors, such as the movement of a hand over a surface by cleaning personnel. The occurrence of cleaning behaviors in proximity to a particular surface may be used as an indicator that the surface has been cleaned. Optionally, one or more machine learning models are trained to identify the cleaning procedures. For example, the machine learning model(s) may be trained to identify a hand, a cleaning implement, such as a wipe, and/or a hand grasping a cleaning implement. A determination that a given surface has been cleaned may be made, for example, when there is evidence of cleaning of the surface for a predetermined period of time and/or for a predetermined amount of the surface.

According to an aspect, a method for monitoring cleaning of a medical room includes receiving imaging of the medical room, the imaging capturing signatures of cleaning deposits on one or more surfaces of the medical room deposited via a cleaning process; analyzing the imaging to: identify one or more surfaces in the medical room that should be cleaned, and determine which of the one or more surfaces have been cleaned by identifying the signatures of the cleaning deposits; and displaying an indication of at least one of: (1) the surfaces that have been cleaned, and (2) one or more surfaces that have not been cleaned.

Optionally, the signatures of cleaning deposits are fluorescence signatures.

Optionally, the imaging comprises fluorescence imaging.

Optionally, the imaging comprises visible light imaging.

Optionally, the imaging was captured by at least one room mounted camera.

Optionally, the cleaning deposits were deposited by at least one wipe that comprises a fluorescence imaging agent.

Optionally, analyzing the imaging to determine which of the one or more surfaces have been cleaned comprises identifying the one or more surfaces according to a cleaning protocol.

Optionally, the signatures of cleaning deposits comprise moisture signatures.

Optionally, imaging comprises short-wave infrared (SWIR) imaging.

According to an aspect, a system includes one or more processors, memory, and one or more programs stored in the memory for execution by the one or more processors for: receiving imaging of the medical room, the imaging capturing signatures of cleaning deposits on one or more surfaces of the medical room deposited via a cleaning process; analyzing the imaging to: identify one or more surfaces in the medical room that should be cleaned, and determine which of the one or more surfaces have been cleaned by identifying the signatures of the cleaning deposits; and transmitting data to at least one display for displaying an indication of at least one of: (1) the surfaces that have been cleaned, and (2) one or more surfaces that have not been cleaned.

Optionally, the system includes at least one room mounted camera for generating the imaging.

Optionally, the system includes at least one room mounted fluorescence excitation light source.

Optionally, the system includes at least one medical light for illuminating a patient during a medical procedure comprises the at least one room mounted fluorescence excitation light source.

Optionally, the signatures of cleaning deposits are fluorescence signatures.

Optionally, the imaging comprises fluorescence imaging.

Optionally, the imaging comprises visible light imaging.

Optionally, the imaging was captured by at least one room mounted camera.

Optionally, the cleaning deposits were deposited by at least one wipe that comprises a fluorescence imaging agent.

Optionally, analyzing the imaging to determine which of the one or more surfaces have been cleaned comprises identifying the one or more surfaces according to a cleaning protocol.

Optionally, the signatures of cleaning deposits comprise moisture signatures.

Optionally, the imaging comprises short-wave infrared (SWIR) imaging.

According to an aspect, a method for monitoring cleaning of a medical room includes receiving imaging of the medical room; analyzing the imaging to: identify one or more surfaces in the medical room that should be cleaned, and detect performance of one or more cleaning behaviors by personnel in the medical room; determining which surfaces have been cleaned based on correlating the detected one or more cleaning behaviors with the one or more surfaces; and displaying at least one indication of at least one of: (1) the surfaces that have been cleaned, and (2) at least one of the one or more surfaces that have not been cleaned.

Optionally, at least one machine learning model is used to detect performance of the one or more cleaning behaviors.

Optionally, the at least one machine learning model is configured to detect a hand grasping a cleaning implement.

Optionally, the one or more surfaces in the medical room are identified using a first machine learning model and performance of the one or more cleaning behaviors is detected using a second machine learning model that is different than the first machine learning model.

Optionally, the performance of the one or more cleaning behaviors is detected using at least one sensor sensing contact with the one or more surfaces in addition to using the second machine learning model.

Optionally, determining which surfaces has been cleaned comprises determining that a cleaning procedure has been performed for a threshold amount of time.

Optionally, the imaging comprises imaging from multiple cameras.

Optionally, the at least one indication comprises a textual indication.

Optionally, the at least one indication is provided in an image of the medical room.

Optionally, the at least one indication comprises a visual indicator displayed in association with a surface in the image.

Optionally, the visual indicator comprises at least one of outlining of the surface and coloring of the surface.

Optionally, the one or more surfaces in the medical room that should be cleaned are identified at least in part based on detecting touching of the one or more surfaces by people during a medical procedure.

Optionally, the method includes, for a respective surface to be cleaned, providing a first visual indication in an image of the medical room that the surface should be cleaned, and replacing the first visual indication with a second visual indication upon detecting that the respective surface has been cleaned.

According to an aspect, a system includes one or more processors, memory, and one or more programs stored in the memory for execution by the one or more processors for: receiving imaging of the medical room; analyzing the imaging to: identify one or more surfaces in the medical room that should be cleaned, and detect performance of one or more cleaning procedures by personnel in the medical room; determining which surfaces have been cleaned based on correlating the detected one or more cleaning procedures with the one or more surfaces; and transmitting data to at least one display for displaying at least one indication of at least one of: (1) the surfaces that have been cleaned, and (2) at least one of the one or more surfaces that have not been cleaned.

Optionally, the system is configured to use at least one machine learning model to detect performance of the one or more cleaning behaviors.

Optionally, the at least one machine learning model is configured to detect a hand grasping a cleaning implement.

Optionally, the one or more surfaces in the medical room are identified using a first machine learning model and performance of the one or more cleaning behaviors is detected using a second machine learning model that is different than the first machine learning model.

Optionally, the performance of the one or more cleaning behaviors is detected using at least one sensor sensing contact with the one or more surfaces in addition to using the second machine learning model.

Optionally, determining which surfaces has been cleaned comprises determining that a cleaning procedure has been performed for a threshold amount of time.

Optionally, the imaging comprises imaging from multiple cameras.

Optionally, the at least one indication comprises a textual indication.

Optionally, the at least one indication is provided in an image of the medical room.

Optionally, the at least one indication comprises a visual indicator displayed in association with a surface in the image.

Optionally, the visual indicator comprises at least one of outlining of the surface and coloring of the surface.

Optionally, the one or more surfaces in the medical room that should be cleaned are identified at least in part based on detecting touching of the one or more surfaces by people during a medical procedure.

Optionally, the system is configured for, for a respective surface to be cleaned, providing a first visual indication in an image of the medical room that the surface should be cleaned, and replacing the first visual indication with a second visual indication upon detecting that the respective surface has been cleaned.

It will be appreciated that any of the variations, aspects, features and options described in view of the systems apply equally to the methods and vice versa. It will also be clear that any one or more of the above variations, aspects, features and options can be combined.

BRIEF DESCRIPTION OF THE FIGURES

The invention will now be described, by way of example only, with reference to the accompanying drawings, in which.

DETAILED DESCRIPTION

Figure 1:
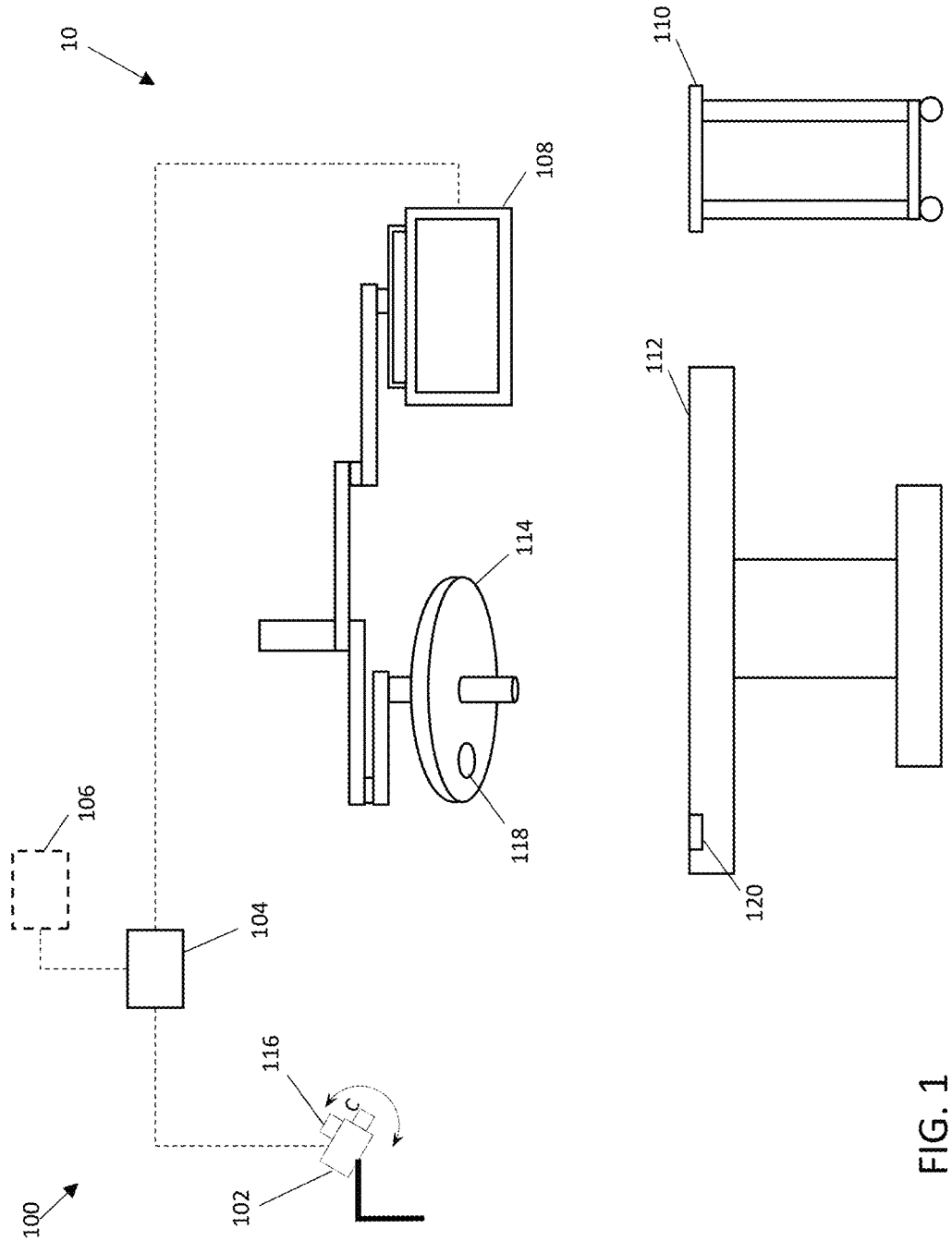
FIG. 1 is a schematic illustration of an exemplary operating room that includes an example of a monitoring system for monitoring cleaning of the room.

Reference will now be made in detail to implementations and examples of various aspects and variations of systems and methods described herein. Although several exemplary variations of the systems and methods are described herein, other variations of the systems and methods may include aspects of the systems and methods described herein combined in any suitable manner having combinations of all or some of the aspects described.

Systems and methods, according to the principles described herein, can provide automatic monitoring of medical room cleaning, helping to ensure that medical rooms are properly cleaned between procedures. This can reduce the risk of patient infection and improve treatment outcomes. According to various aspects, imaging of a medical room is captured by one or more in-room cameras before, during, and/or after a medical procedure. The imaging is analyzed to automatically determine whether surfaces that should be cleaned have been cleaned. The cleaning crew within the medical room could be notified of surfaces that have and/or have not been cleaned to help them track their progress. Additionally or alternatively, information about which surfaces have been cleaned can be used for supervision of the cleaning crew and/or recording cleaning history.

According to an aspect, imaging of a medical room is analyzed to identify signatures of cleaning on surfaces that should be cleaned between medical procedures in the medical room. Cleaning protocols may designate certain surfaces in the medical room for cleaning between procedures. For example, surfaces of the top portion of a surgical table, surgical carts, surgical lights, and surgical equipment used in or near the sterile field may each be designated for cleaning between procedures. These surfaces may be monitored for identifying signatures of cleaning. This can include automatically identifying moisture on surfaces left behind by a cleaning fluid, automatically identifying chemical deposits associated with a component of a cleaning fluid, and/or automatically identifying indications of a cleaning behavior by the cleaning crew. A determination that a designated surface has been cleaned may be made when, for example, a signature of cleaning is identified that corresponds with the designated surface.

According to various aspects, one or more machine learning models are used for analyzing imaging to identify surfaces designated for cleaning. The one or more machine learning models may be trained to identify surfaces in a medical room that should be cleaned. For example, surfaces that should be cleaned may be labeled in training images and the labeled training images may be used for training a machine learning model to automatically identify the similar surfaces in imaging. The surfaces identified in the imaging may be analyzed for identification of cleaning signatures. In some variations, once a surface that is designated to be cleaned has been identified, the surface is monitored for signatures of cleaning. In some variations, designated surfaces and signatures of cleaning are identified in parallel and a correlation between them is used to determine whether the surfaces to be cleaned have been cleaned.

According to an aspect, identifying signatures of cleaning includes identifying cleaning behavior in the imaging. Cleaning behavior may be, for example, the movement of a hand and cleaning implement (e.g., a cleaning cloth) in proximity to a surface to be cleaned. One or more machine learning models may be trained to identify hands, cleaning implements, and/or other features associated with cleaning that may appear in imaging, and the presence of, for example, hands with cleaning implements in proximity to a surface to be cleaned for a sufficient period of time may trigger a determination that a given surface has been cleaned.

According to an aspect, identifying signatures of cleaning includes identifying deposits associated with cleaning on surfaces to be cleaned. In some variations, this can include identifying moisture left behind by cleaning, for example, using short-wave infrared (SWIR) imaging. An imaging modality such as SWIR could be used to detect multiple different signatures of cleaning, including multiple different types of cleaning fluids. In some variations, a cleaning substance may include a dye that deposits on surfaces during cleaning and remains on surfaces for a sufficient period of time to allow for detection of the deposits after cleaning but dissipates sufficiently quickly that the dye is no longer detectable on the surfaces after a subsequent medical procedure. The dye could be invisible to the naked eye and may be detectable using a suitable imaging modality. For example, the dye could be a fluorescing dye that fluoresces in a non-visible wavelength and/or fluoresces in response to a non-visible fluorescence excitation light. Visible light imaging could be used to identify the surfaces to be cleaned, as discussed above, and a dye-detecting imaging modality (such as an infrared imaging modality) may be used to detect the dye. The imaging modalities may be analyzed to determine whether the dye is detected in portions of the imaging associated with surfaces to be cleaned.

Systems and methods according to the principles described herein can facilitate the proper cleaning of medical rooms by providing information to cleaning crews and/or supervisory personnel about cleaning progress. By helping to ensure proper cleaning of medical rooms, the systems and methods can help improve patient safety by reducing the risk of infection associated with pathogens in the medical room that can be eliminated through proper cleaning.

In the following description, it is to be understood that the singular forms "a," "an," and "the" used in the following description are intended to include the plural forms as well, unless the context clearly indicates otherwise. It is also to be understood that the term "and/or" as used herein refers to and encompasses any and all possible combinations of one or more of the associated listed items. It is further to be understood that the terms "includes," "including," "comprises," and/or "comprising," when used herein, specify the presence of stated features, integers, steps, operations, elements, components, and/or units but do not preclude the presence or addition of one or more other features, integers, steps, operations, elements, components, units, and/or groups thereof.

Certain aspects of the present disclosure include process steps and instructions described herein in the form of an algorithm. It should be noted that the process steps and instructions of the present disclosure could be embodied in software, firmware, or hardware and, when embodied in software, could be downloaded to reside on and be operated from different platforms used by a variety of operating systems. Unless specifically stated otherwise as apparent from the following discussion, it is appreciated that, throughout the description, discussions utilizing terms such as "processing," "computing," "calculating," "determining," "displaying," "generating" or the like, refer to the action and processes of a computer system, or similar electronic computing device, that manipulates and transforms data represented as physical (electronic) quantities within the computer system memories or registers or other such information storage, transmission, or display devices.

The present disclosure in some examples also relates to a device for performing the operations herein. This device may be specially constructed for the required purposes, or it may comprise a general-purpose computer selectively activated or reconfigured by a computer program stored in the computer. Such a computer program may be stored in a non-transitory, computer readable storage medium, such as, but not limited to, any type of disk, including floppy disks, USB flash drives, external hard drives, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability. Suitable processors include central processing units (CPUs), graphical processing units (GPUs), field programmable gate arrays (FPGAs), and ASICs.

The methods, devices, and systems described herein are not inherently related to any particular computer or other apparatus. Various general-purpose systems may also be used with programs in accordance with the teachings herein, or it may prove convenient to construct a more specialized apparatus to perform the required method steps. The required structure for a variety of these systems will appear from the description below. In addition, the present invention is not described with reference to any particular programming language. It will be appreciated that a variety of programming languages may be used to implement the teachings of the present invention as described herein.

FIG. 1 is a schematic illustration of an exemplary operating room 10 that includes a monitoring system 100 for monitoring cleaning of the room. Monitoring system 100 includes a camera system 102 for imaging the operating room and a computing system 104 configured for analyzing imaging data generated by the camera system 102 for automatically detecting cleaning of designated surfaces of equipment and devices in the operating room. Examples of equipment and devices typically found in an operating room that may require cleaning between procedures include an operating table 112, one or more carts 110, one or more surgical lights 114, and one or more displays 108.

The camera system 102 generates imaging of the operating room. The imaging can include single images or video frames. The camera system 102 can include one or more cameras of any suitable type. For example, the camera system 102 may include one or more pan, tilt, zoom (PTZ) cameras. The one or more cameras of the camera system 102 may be positioned to capture a sufficient amount of the operating room for monitoring cleaning of the equipment and devices in the operating room. The camera system 102 may continuously image the operating room or may periodically image the operating room. The camera system 102 may include any suitable imaging modality or combination of imaging modalities. The camera system 102 may include visible light imaging, infrared imaging, ultraviolet imaging, or any combination of these. In some variations, the camera system 102 includes one or more illuminators 116 for illuminating the scene. This may be useful, in particular, for non-visible illumination of the scene in support of non-visible light imaging modalities. One or more illuminators 116 could be included with one or more cameras of the camera system 102, as illustrated, or could be provided in a separate location. For example, an illuminator 118 could be incorporated into a surgical light 114 or other lighting within the medical room 10, including ceiling lights.

Computing system 104 receives imaging from the camera system 102 and automatically detects cleaning of the equipment and/or devices in the operating room that should be cleaned. The computing system 104 may be communicatively connected to one or more displays 108 in the operating room for displaying information related to the cleaning of the operating room. The computing system 104 may additionally or alternatively be connected to a remote system 106 for communicating information related to the cleaning of the operating room to the remote system 106. The remote system 106 may include a display, such as located at a nurses station, for displaying information related to the cleaning to personnel outside of the operating room for monitoring the cleaning of the operating room. The remote system 106 may be or include a record keeping system for keeping records of the cleaning of medical rooms.

Figure 2:
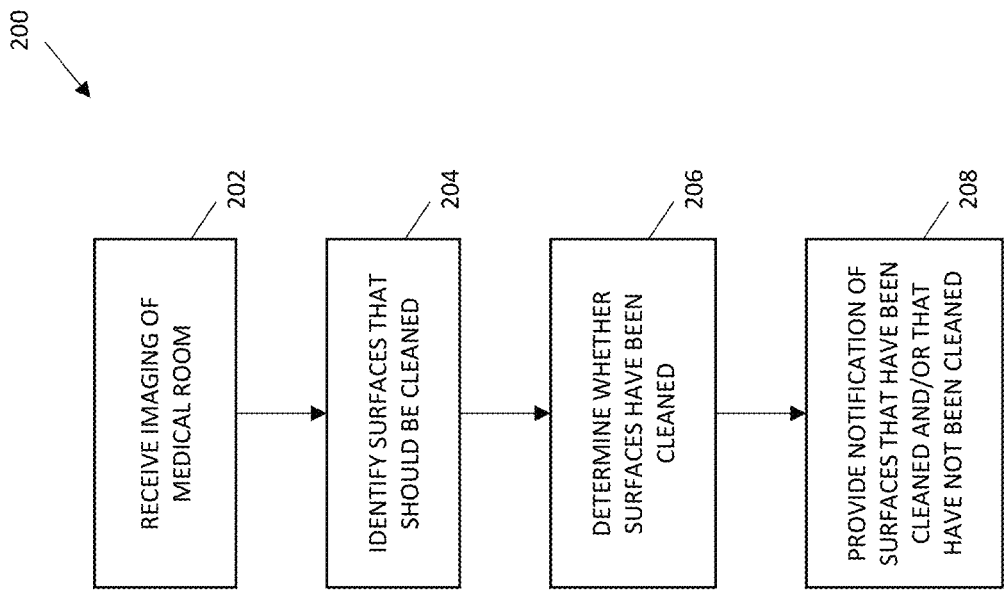
FIG. 2 is a flow diagram of an exemplary method for monitoring the cleaning of a medical room.

FIG. 2 is a flow diagram of an exemplary method 200 for monitoring the cleaning of a medical room, such as operating room 10 of FIG. 1. Method 200 could be performed, for example, by computing system 104 of FIG. 1. Method 200 could be performed continuously or periodically, such as in the period between medical procedures in a medical room. Method 200 could be performed in response to a user request. For example, personnel could initiate method 200 upon completion of a medical procedure or cleaning personnel, or medical room monitoring personnel may initiate method 200 at the start of a cleaning procedure.

At step 202, imaging of a medical room are received by the computing system. The imaging may be one or more images and/or one or more video frames or a series of images and/or video frames. The imaging can include imaging captured by multiple different cameras. The imaging captures at least a portion of a medical room, including one or more objects in the medical room that should be cleaned. For example, with reference to FIG. 1, the imaging may capture at least a portion of operating table 112, cart 110, surgical light 114, and display 108. The imaging may be generated by one or more camera systems, such as one or more PTZ cameras or any other suitable types of cameras. The imaging may include visible light imaging, non-visible light imaging, or any combination of visible and non-visible light imaging.

At step 204, at least some of the imaging received at step 202 is analyzed to identify in the imaging one or more surfaces that should be cleaned. This may be done using a machine learning model that is trained to identify designated surfaces and/or objects in the medical room. For example, with reference to FIG. 1, a machine learning model, such as classifier, may be trained to identify in the imaging one or more of table 112, cart 110, surgical light 114, and display 108 and/or one or more surfaces of these objects.

Figure 3:
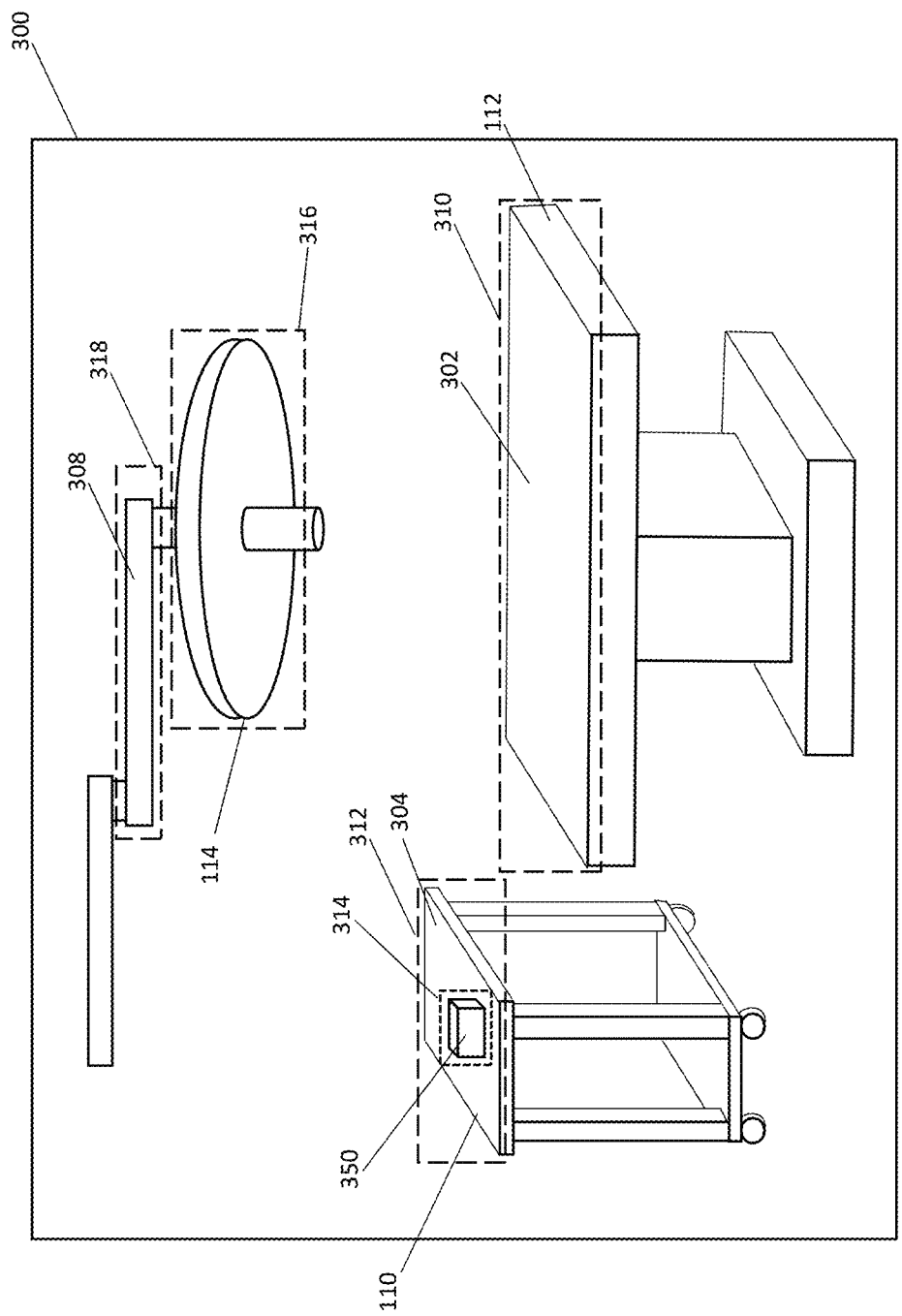
FIG. 3 illustrates an example of the identification of one or more surfaces in an exemplary image of a medical room.

FIG. 3 illustrates an example of the result of the identification of one or more surfaces in imaging. FIG. 3 includes an image 300 of a medical room that captures the table 112, cart 110, surgical light 114, and a device 350 located on the cart 110. A top surface 302 of the table 112, a top surface 304 of the cart 110, the outer surface 316 of the surgical light 114, and a boom arm 308 supporting the surgical light 114 have been identified in the image, according to step 204 of method 200. The identified surfaces may be types of surfaces that are designated for cleaning according to a predetermined cleaning protocol. For example, a cleaning protocol for an operating room may designate the top surface of a surgical table, top surfaces of carts, the outer surface of the surgical light, boom arms, and devices positioned are carts for cleaning between procedures, and a machine learning model may be trained to identify these types of surfaces and any other types of surfaces designated for cleaning. The machine learning model may be trained such that it does not identify surfaces or objects that are not supposed to be cleaned according to the cleaning protocol. The machine learning model may be configured to generate a bounding box for each identified object and/or surface. The example illustrated in FIG. 3 includes bounding box 310 for surface 302, bounding box 312 for surface 304, bounding box 314 for device 350, bounding box 316 for surgical light 114, and bounding box 318 for boom arm 308.

The machine learning model may include a single classifier that classifies regions of the image as either a designated surface or not. Alternatively, the machine learning model may include multiple classifiers that are capable of identifying a type of a given surface. For example, the machine learning model may not only identify that surface 302 and 304 are surfaces that should be cleaned but also that surface 302 is a surface of a surgical table and surface 304 is a surface of a cart.

Returning to FIG. 2, method 200 continues with step 206 in which the computing system determines whether one or more of the surfaces identified in step 204 has been cleaned. The imaging is analyzed to automatically detect signatures of cleaning associated with the identified surfaces. According to some variations, the signatures of cleaning associated with the identified surfaces are deposits on the surfaces that are detectable in the imaging. Deposits may be, for example, a component of a cleaning fluid used for cleaning the surface. The cleaning fluid could be, for example, a spray-on cleaning fluid or a cleaning fluid absorbed into cleaning wipes. The component of the cleaning fluid may remain on a surface for a sufficient length of time after the surface has been cleaned to enable detection of the component in the imaging but sufficiently volatile that the component breaks down or dissipates from the surface within a suitable period of time so that the surface does not appear to be clean after it has been used again. The component could be, for example, a dye that is visible in the imaging. The dye may be invisible to the naked eye but detectable with a non-visible light imaging modality. For example, the dye may be a fluorescence imaging agent that fluoresces in a non-visible wavelength. Alternatively, the fluorescence imaging agent could fluoresce in a visible wavelength but only in response to a non-visible excitation wavelength such that the fluorescence imaging agent is invisible to the naked eye until illuminated with the non-visible excitation wavelength. The fluorescence imaging agent could be sufficiently volatile that the fluorescence imaging agent loses its fluorescing properties over a sufficiently short period of time that the fluorescence imaging agent is no longer detectable in fluorescence imaging during a medical procedure following the cleaning procedure. For example, the fluorescence imaging agent may be formulated to lose its fluorescing properties within 30 minutes after being deposited on a cleaned surface, preferably within 20 minutes after being deposited on a cleaned surface, more preferably within 15 minutes after being deposited on a cleaned surface, or most preferably within 10 minutes after being deposited on a cleaned surface. The fluorescence imaging agent may be formulated to maintain its fluorescing properties after being deposited on a cleaned surface for at least 1 minute, for at least 2 minutes, for at least 5 minutes, or for at least 10 minutes.

With reference to FIG. 1, an imaging system, such as imaging system 102 of system 100, may include illuminator 116 and/or illuminator 118 for providing illumination for detecting the dye or other cleaning deposit. The illuminators 116, 118 could be, for example, infrared (e.g., near infrared, shortwave infrared, etc.) or ultraviolet illumination sources.

Another example of deposits indicative of cleaning that may be detected is moisture left behind after a surface has been cleaned. A suitable imaging modality may be used to detect the moisture on the surface. For example, short wave infrared (SWIR) imaging may be used to detect the moisture left behind after cleaning since moisture has a high absorption rate at SWIR wavelengths. SWIR could be used to detect one or more cleaning fluids (not just the moisture in them) based on the spectral signature. SWIR could be used to differentiate between different cleaning fluids to the extent the different cleaning fluids have different spectral signatures.

Figure 4:
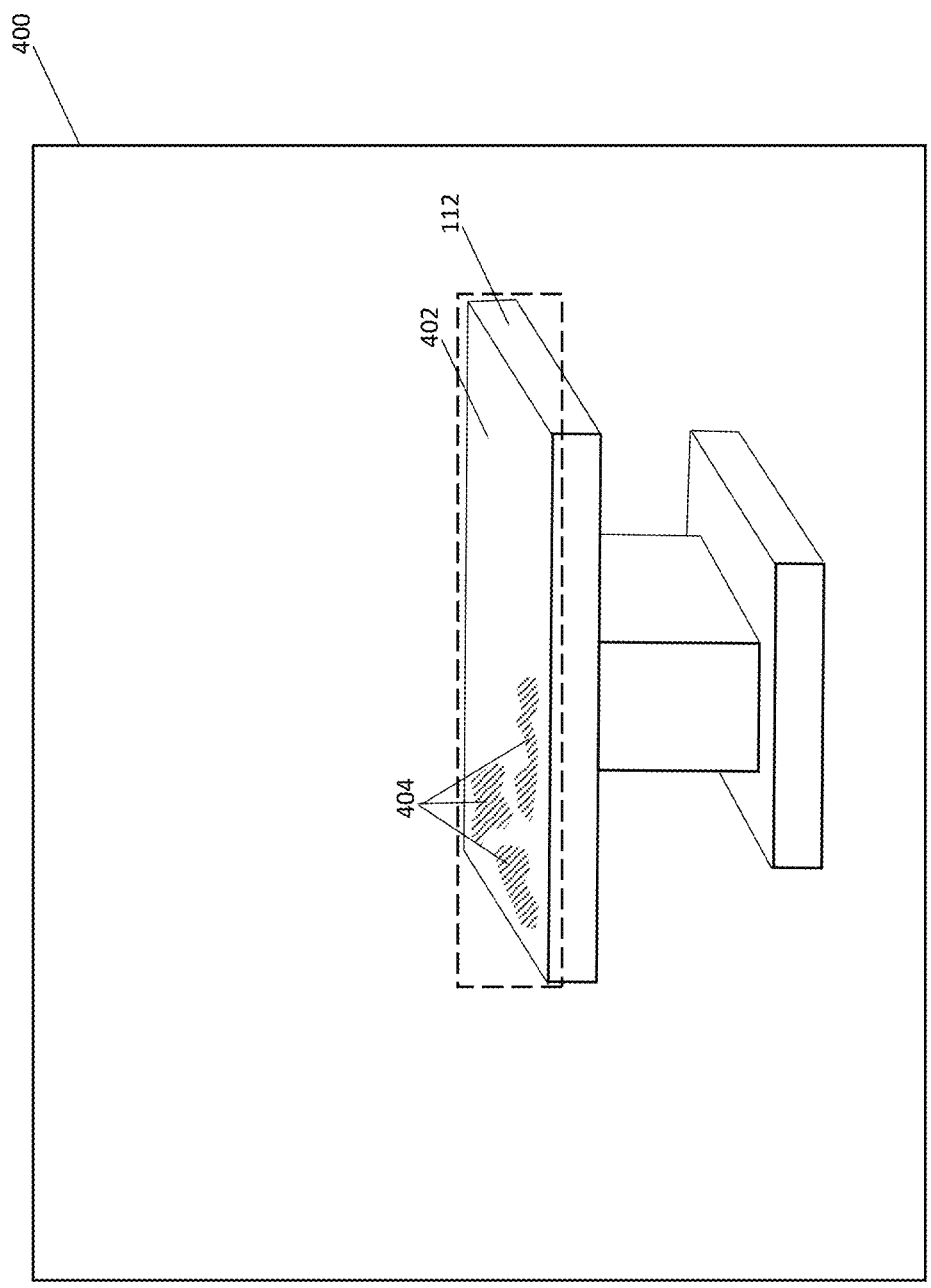
FIG. 4 illustrates an example of the detection of a cleaning deposit in an exemplary image of a medical room.

FIG. 4 illustrates the detection of a cleaning deposit in an exemplary image of a medical room, according to aspects of the principles discussed above. The image 400 captures table 112. A top surface 402 of the table 112 has been detected in the image 400. Cleaning deposits 404 have been detected in the portion of the image corresponding to the identified top surface 402 of the table 112. The cleaning deposits 404 can include one or more cleaning fluids not wiped from the surface or one or more constituents of one or more cleaning fluids, such as moisture or a dye. A determination that the surface 402 has been cleaned may be based on the presence of the cleaning deposits 404 in the portion of the image 400 corresponding to the surface 402. The determination that the surface has been cleaned may be based on a threshold amount of cleaning deposits 404 being detected and/or a threshold coverage of the surface 402.

Figure 5A:
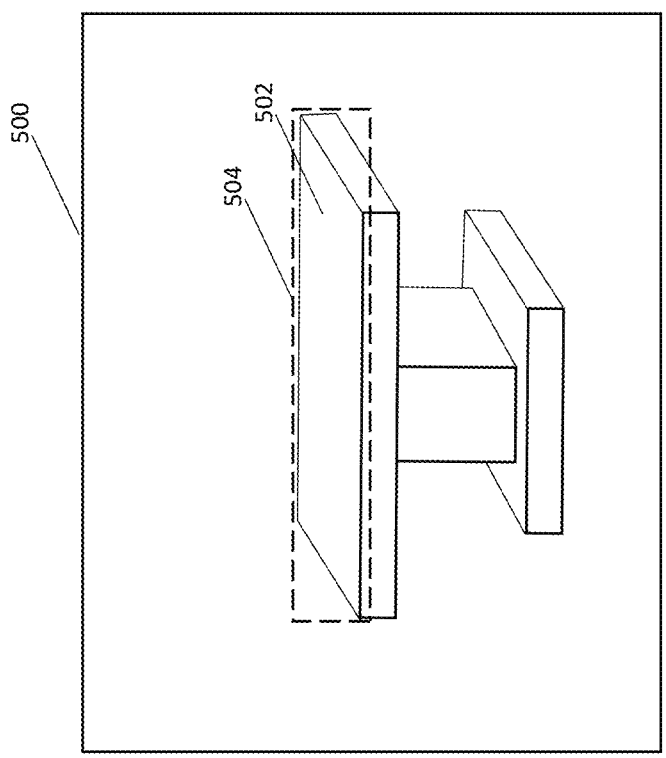
FIG. 5A illustrates an example of a first imaging mode image used for detecting surfaces.
Figure 5B:
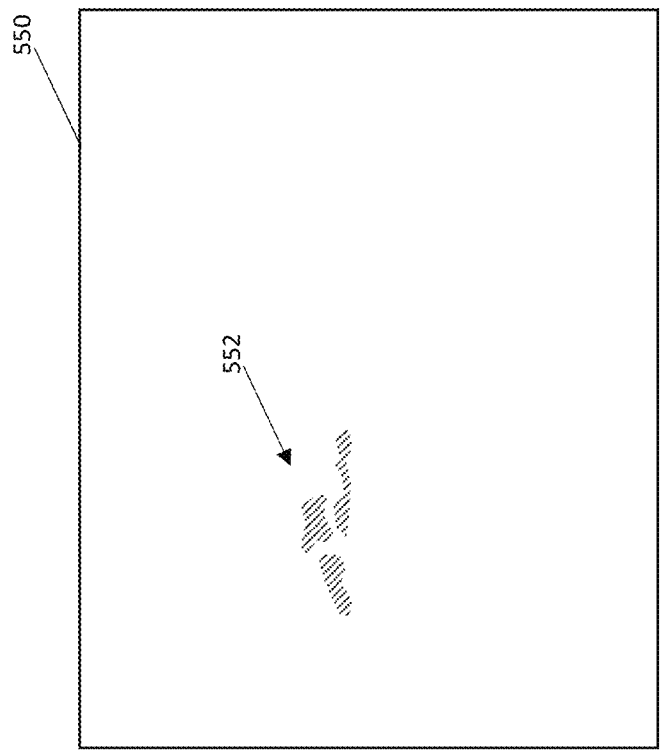
FIG. 5B illustrates an example of a second imaging mode image used for detecting signatures of cleaning.

The identification of surfaces to be cleaned and the detection of signatures of cleaning may use different imaging modalities. For example, a visible light imaging modality may be used for detection of surfaces and a non-visible light imaging modality may be used for detecting cleaning deposits. The information from these two imaging modalities may be combined to determine whether a given surface has been cleaned. FIG. 5A illustrates an exemplary first image 500 generated using a first imaging modality and FIG.

5B illustrates an exemplary second image 550 generated using a second imaging modality. The first image 500 is used for detecting a surface 502 that should be cleaned, as indicated by bounding box 504, according to the principles discussed above. The first image 500 could be, for example, a visible light image. The second image 550 is used for detecting deposits 552 that are captured using the second imaging mode but are not discernable using the first imaging mode. A computing system may identify the signatures of the deposits 552 in the second image 550, such as based on pixel values that are above or below a predetermined intensity threshold or by using any other suitable image processing technique. In some variations, a machine learning model is trained to detect signatures of deposits 552. The machine learning model used to detect signatures of deposits may be different than the machine learning model used to detect the surfaces in the imaging.

The first image 500 and second image 550 may be registered to one another and the computing system may determine whether the cleaning deposits 552 are located in the region of the second image 550 that corresponds to the surface 502 identified in the first image 500. Any suitable thresholds may be used to determine whether sufficient signatures of cleaning deposits have been detected to designate a given surface as having been cleaned. For example, pixel intensities could be compared with a threshold such that intensities that are too low are not counted as indicative of cleaning, and/or a threshold for a number or percentage of pixels or other measure of surface coverage corresponding with the surface to be cleaned could be used.

According to some variations, signatures of cleaning associated with the surfaces that are identified in imaging according to step 206 include one or more cleaning behaviors. Imaging may be analyzed while cleaning personnel are cleaning a medical room and various actions of the cleaning personnel captured in imaging may be analyzed to determine whether the actions indicate cleaning of one or more surfaces to be cleaned. For example, imaging may be analyzed to detect a hand or a hand holding a cleaning implement that is in proximity to (e.g., on top of) a surface to be cleaned. Additionally or alternatively, motion of a hand or a hand holding a cleaning implement, motion of the cleaning implement by itself, or any other suitable movement-based indication of a cleaning operation may be detected in the imaging.

Cleaning behavior may be detected using, for example, a machine learning model trained to identify the cleaning behavior or aspects of the cleaning behavior in the imaging. For example, a machine learning model may be trained to identify a hand, a hand holding a cleaning implement, and/or the cleaning implement by itself in imaging. This machine learning model may be different than the machine learning model used to detect the surfaces in the image or a single machine learning model may be configured to detect surfaces and to detect the indicators of cleaning behavior. When cleaning behaviors are detected for an identified surface to be cleaned, the surface may be designated as having been cleaned.

Figure 6:
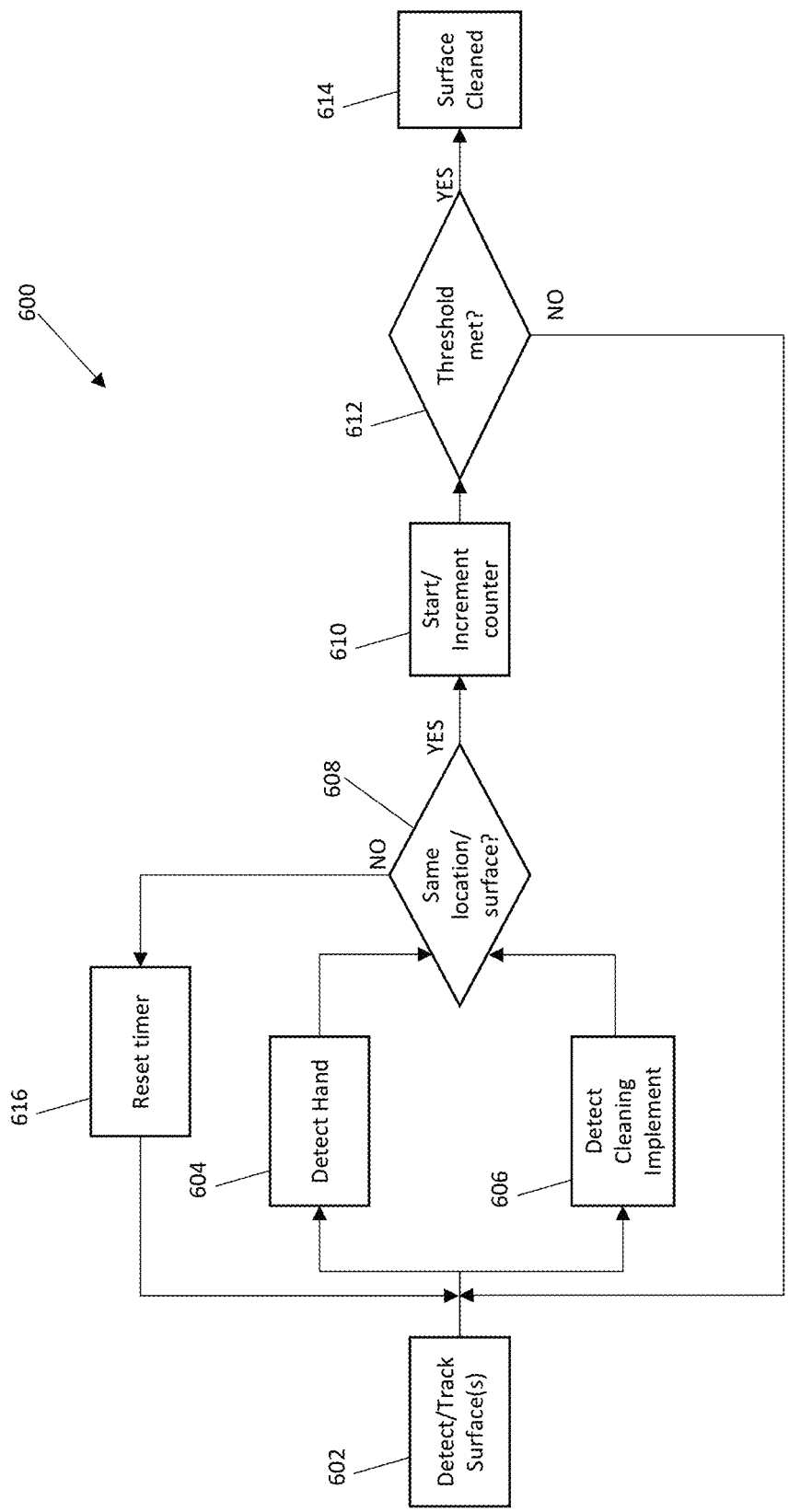
FIG. 6 illustrates an exemplary method for determining surfaces that have been cleaned by identifying cleaning behaviors in imaging.

FIG. 6 illustrates an exemplary method 600 for determining surfaces that have been cleaned by identifying cleaning behaviors in imaging. Method 600 may be used, for example, for steps 204 and 206 of method 200 of FIG. 2 and may be performed, for example, by a computing system such as computing system 104 of FIG. 1. At step 602, surfaces and/or objects are detected and/or tracked in imaging (e.g., a video frame) received from an imaging system, such as camera system 102 of FIG. 1, as discussed above with respect to step 204 of method 200. Once a given surface or object has been detected for the first time, the surface or object may thereafter be tracked by the computing system using any suitable object tracking method. This may reduce the computational load since object tracking can be less computationally intensive than object detection.

At step 604 and 606, the computing system analyzes the imaging to detect objects associated with cleaning, which in this example are a hand and a cleaning implement, respectively. The computing system may be configured to detect any number of hands and/or cleaning implements. For example, the computing system may detect a hand and cleaning implement of a first cleaning personnel cleaning a first surface and simultaneously detect a hand and cleaning implement of a second cleaning personal cleaning a second surface. The number of hands, cleaning implements, and/or other objects associated with cleaning behaviors that may be detected is not limited. A machine learning model, such as a classifier, may be used to detect the hand and cleaning implement. The machine learning model may analyze the entire image or may analyze one or more regions of interest in the image. For example, the machine learning model may analyze only those portions of the image associated with a surface and/or object detected or tracked in step 602. The depiction of steps 604 and 606 as separate steps is merely illustrative. The detection of one or more hands and one or more cleaning implements can be done simultaneously by the same machine learning model. Generally, a machine learning model can be trained to detect multiple types of objects that are indicative of cleaning behavior simultaneously.

At step 608, a determination is made whether a hand and a cleaning implement are detected at the same location as one another and as a surface to be cleaned that was detected at step 602. Any suitable test can be used for determining whether a hand and cleaning implement are at the same location as one another and as a surfaces to be cleaned. For example, the hand and cleaning implement may be determined to be at the same location if, for example, bounding boxes for the hand and cleaning implement overlap in any amount or by a threshold amount or if a bounding box for one is completely enclosed by a bounding box for the other. The same conditions or any other suitable conditions could be used for determining whether the hand and/or cleaning implement are located at the same location as a surface to be cleaned.

Figure 7:
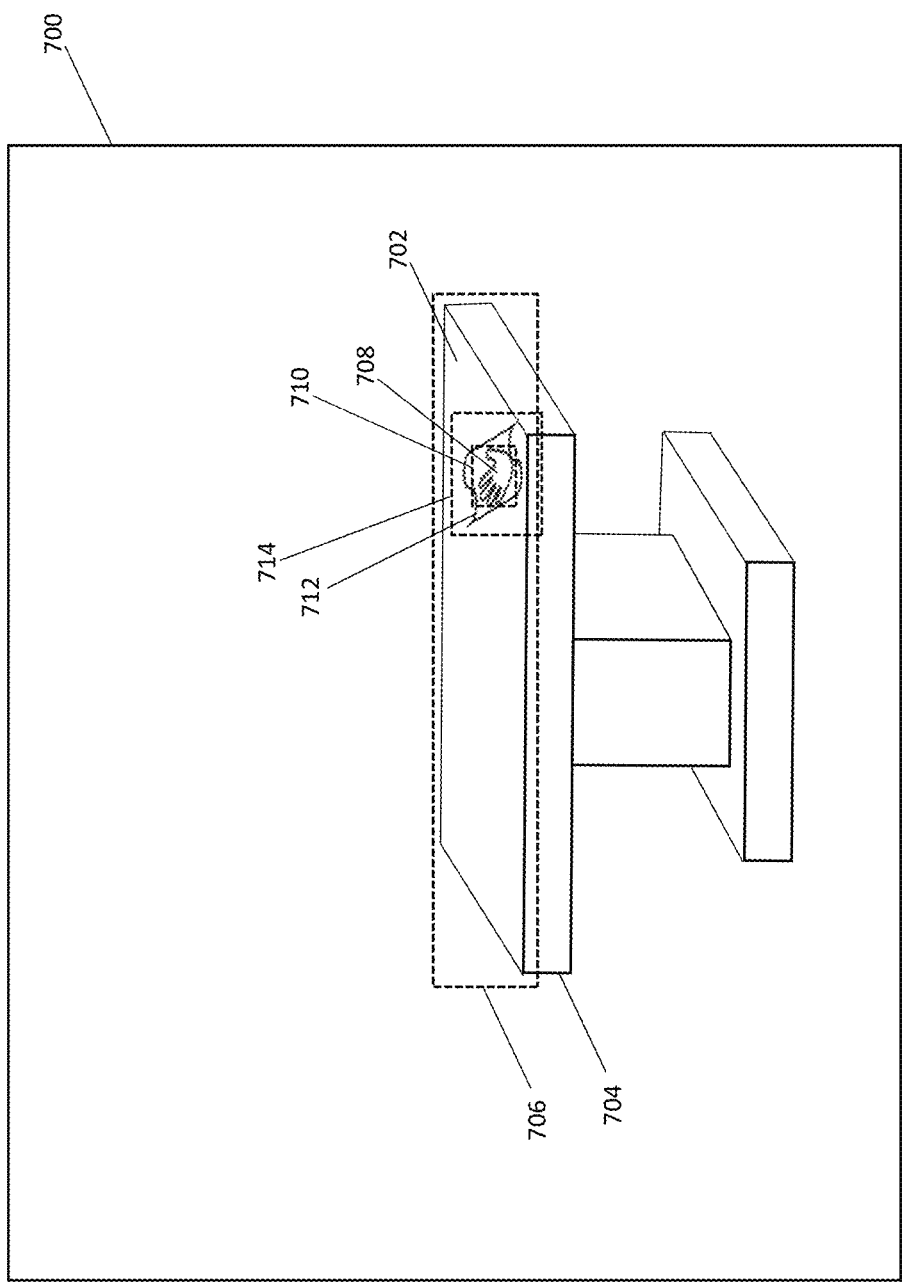
FIG. 7 illustrates an example of determining whether a hand and a cleaning implement are detected at the same location as one another and as a surface to be cleaned detected.

FIG. 7 illustrates an example of determining whether a hand and a cleaning implement are detected at the same location as one another and as a detected surface to be cleaned, according to step 608. In the image 700 of FIG. 7, a surface 702 of surgical table 704 has been detected and a bounding box 706 that encompasses the surface 702 has been generated, according to step 602. A hand 708 has been detected and a bounding box 710 that encompasses the hand 708 has been generated, according to step 604. Similarly, a cleaning implement 712 (depicted as a cleaning cloth) has been detected and a bounding box 714 that encompasses the cleaning implement 712 has been generated, according to step 606. Because the bounding box 714 of the cleaning implement 712 and the bounding box 710 of the hand 708 overlap with one another and overlap the bounding box 706 of the surface 702, the determination may be made, according to step 608, that the hand 708, cleaning implement 712, and surface 702 are at the same location.

If a hand and cleaning implement are determined at step 608 to be at the same location as one another and as the surface, then a counter may be started or incremented at step

610. The counter may be used to ensure that the hand and cleaning implement are at the same location as one another and as the surface over a relatively extended period of time that is indicative of cleaning, instead of, for example, a mere passage of the hand and cleaning implement over the surface. The counter can be time based (e.g., a certain number of seconds or minutes) or can be instance based (e.g., a certain number of consecutive video frames or images). Where a hand and cleaning implement are detected in the same location as one another and/or as a surface for the first time, the counter can be initiated, and where the hand and cleaning implement are detected in the same location as one another and as the surface once the counter has already been initiated, the counter may be incremented (or allowed to continue to run, where the counter is a timer). A separate counter may be initiated and/or incremented for each distinct surface and/or portion of a surface in the imaging.

At step 612, the counter value is compared to a threshold to determine whether the hand and cleaning implement have been detected in the same location as one another and as the surface for a sufficient amount of time. If so, then the determination may be made at step 614 that the surface has been cleaned. If not, then method 600 may return to steps 604 and 606 for any further imaging received by the computing system.

If a hand, cleaning implement, and surface are determined not to be at the same location at step 608, then method 600 returns to steps 604 and 606 for analyzing any further imaging received by the computing system. If a counter had previously been initiated and/or incremented, the counter may be cleared at step 616.

The steps of method 600 may be performed for any number of detected surfaces and/or objects. The presence of hands and cleaning implements at surface A may be tracked at the same time as the presence of hands and cleaning implements at surface B, with different counters being used. Additional conditions for determining whether a surface has been cleaned may be used. For example, a detected surface may be subdivided into regions and method 600 may be performed for each region to ensure that the entire surface is cleaned, not just a portion of the surface. The surface may not be designated as being clean until each subdivided region is determined as having been cleaned.

Method 600 may be performed continuously throughout a room cleaning process. Upon determining that a given surface has been cleaned, the region of interest associated with the surface may no longer be analyzed to detect cleaning, such as to conserve computing power. Alternatively, the cleaning of a given surface may continue to be tracked even after the surface has been determined to be cleaned. This could be useful for tracking aspects of cleaning other than whether a surface has been cleaned, such as for determining whether cleaning personnel spent too long on a given surface or cleaned a given surface more than once.

Method 600 is merely an example of determining whether a surface has been cleaned. Other methods can include, for example, detecting a cleaning motion, such as by detecting frame-by-frame movements of a detected hand and/or cleaning implement over a surface. In some variations, a machine learning model is configured to detect a hand grasping a cleaning implement, rather than detecting a hand and separately detecting a cleaning implement.

In some variations, non-imaging information may be used in conjunction within imaging information to determine whether a surface has been cleaned. For example, one or more sensors may be used to detect contact of surfaces to be cleaned associated with cleaning. For example, with reference to FIG. 1, a capacitive sensor system 120 may be used to detect touching of the surgical table by cleaning personnel. Any suitable sensor system can be used to detect touching, including, for example, one including one or more pressure sensors. The detection of touching of a given surface to be cleaned can be used as a check on the image-based detection of cleaning such that, for example, a surface is not determined as being cleaned unless touching of the surface has also been detected.

Returning to FIG. 2, method 200 continues with step 208 in which one or more notifications are provided indicating which surfaces and/or objects have been cleaned and/or which surfaces and/or objects have not been cleaned. One more notifications can be provided within the medical room, such as for notifying cleaning personnel of their progress. One or more notifications could be provided outside of the medical room, including for example, to a nurses station or other location for personnel to supervise and/or track room cleaning. Notifications can be provided on a continuous basis as the cleaning crew makes progress. For example, upon a determination being made that a given surface has been cleaned, a notification can be provided that the surface has been cleaned. Notifications can be provided in any suitable manner. In some variations, a user interface is displayed that shows which surfaces designated for cleaning have been cleaned and/or have not yet been cleaned. The user interface could include a list of surfaces designated for cleaning which a graphical indication of the cleaning status of each surface. A user interface could include an image of the room with graphical indicators provided for each displayed surface indicated whether the surface has been cleaned.

Figure 8:
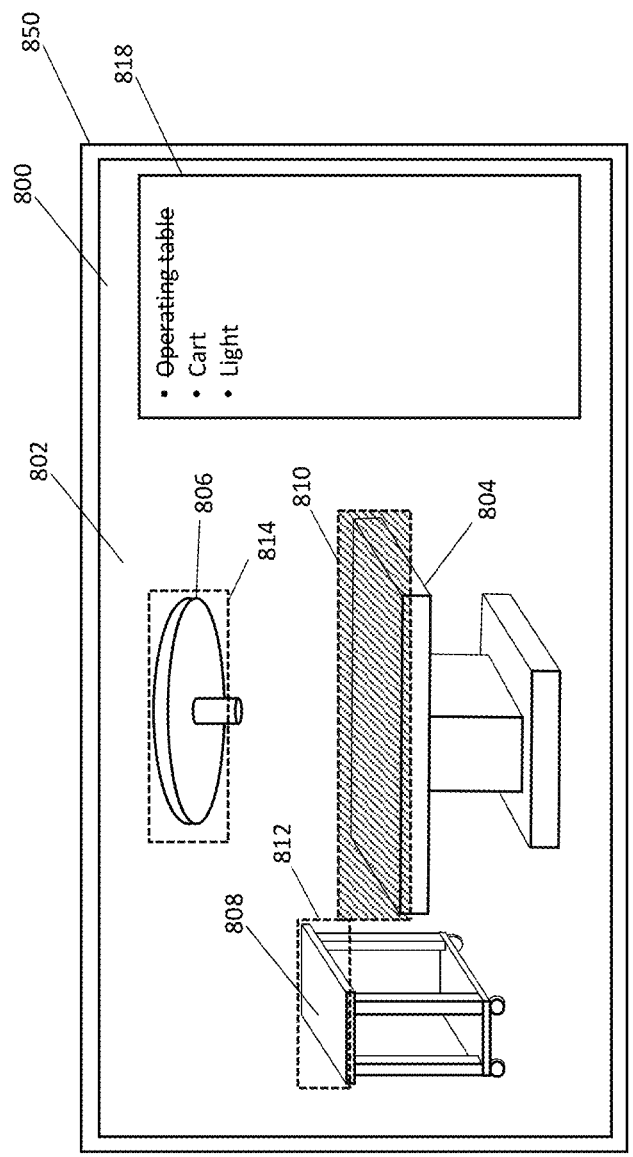
FIG. 8 illustrates an exemplary user interface for providing notifications of which surfaces have been cleaned.

FIG. 8 illustrates an exemplary user interface 800 for providing notifications of which surfaces have been cleaned. User interface 800 may be displayed on a display 850 located within the medical room or located externally of the medical room. User interface 800 includes an image 802 of at least a portion of an operating room, including one or more surfaces of the operating room that are supposed to be cleaned according to a predetermined cleaning protocol. In the illustrated example, the image 802 includes an operating table 804, surgical light 806, and cart 808 of the operating room. Graphical indicators are provided for each of the surfaces of the operating room designated for cleaning, including indicator 810 for the top surface of the operating table 804, indicator 812 for the top surface of the cart 808, and indicator 814 for the surgical light 806. The indicators may be differently colored or otherwise visually varied to indicate the cleaning status of the respective surface. For example, the different appearance of indicator 810 for the top surface of the operating table 804 relative to indicator 812 and 814 may indicate that the top surface of the operating table 804 has been cleaned but the top surface of the cart 808 and the surgical light 806 have not yet been cleaned. For example, green boxes and/or shading can be used to indicate a cleaned surface and red boxes and/or shading can be used to indicate an uncleaned surface. The indicator used for a given surface may change upon a change in the cleaning status of a surface. For example, a surface provided with a red indicator indicating that the surface has not yet been cleaned and may change to green, indicating that the surface is clean, upon the system determining that the surface has been cleaned.

Additionally or alternatively, the graphical user interface 800 can include a checklist 818 or other text-based means for indicating which surfaces have been cleaned. In the illustrated example, the checklist 818 includes a list of the surfaces to be cleaned, with a strikethrough font used to indicate that the operating table 804 has been cleaned. The line items in the checklist 818 can be populated based on the surfaces detected in the medical room The graphical user interface 800 may be updated upon the computing system determining that a surface has been cleaned. For example, upon completion of cleaning of the cart 808, the indicator 812 may change colors from red to green and/or the checklist entry for the cart may change font.

In addition to or instead of providing a notification of surfaces that have been cleaned, cleaning progress may be stored in one or more databases. Storing such records could enable periodic auditing of the cleaning of medical rooms in a given facility. Such information could be included or otherwise linked to a medical record of a patient whose procedure follows the medical room cleaning. Cleaning history and patient treatment outcome could be analyzed to determine whether room cleaning status correlates to treatment outcomes.

Figure 9A:
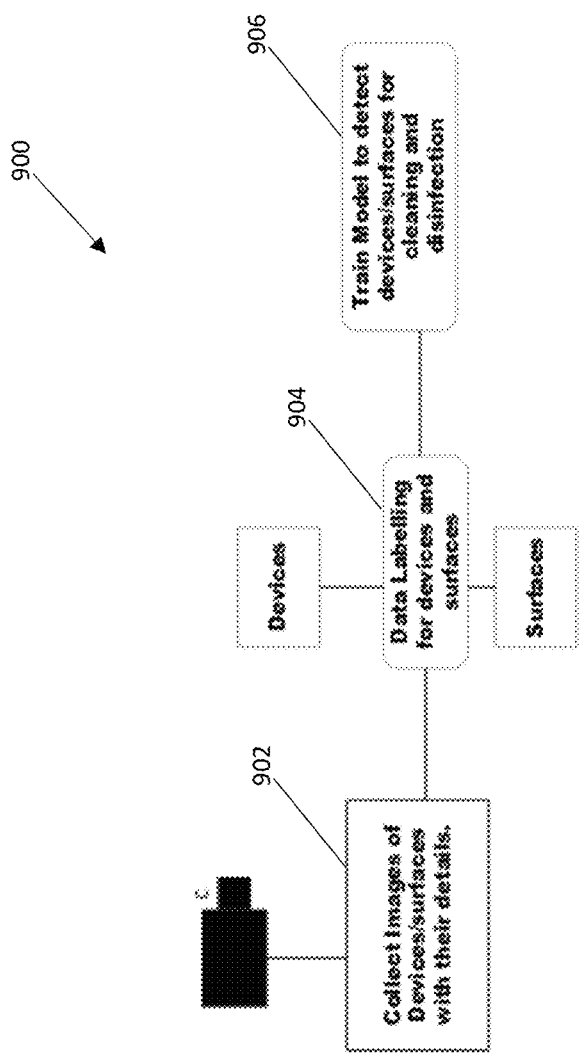
FIGS. 9A-9C illustrate exemplary methods for training machine learning models to perform surface detection, cleaning behavior detection, and cleaning deposit detection, respectively.
Figure 9B:
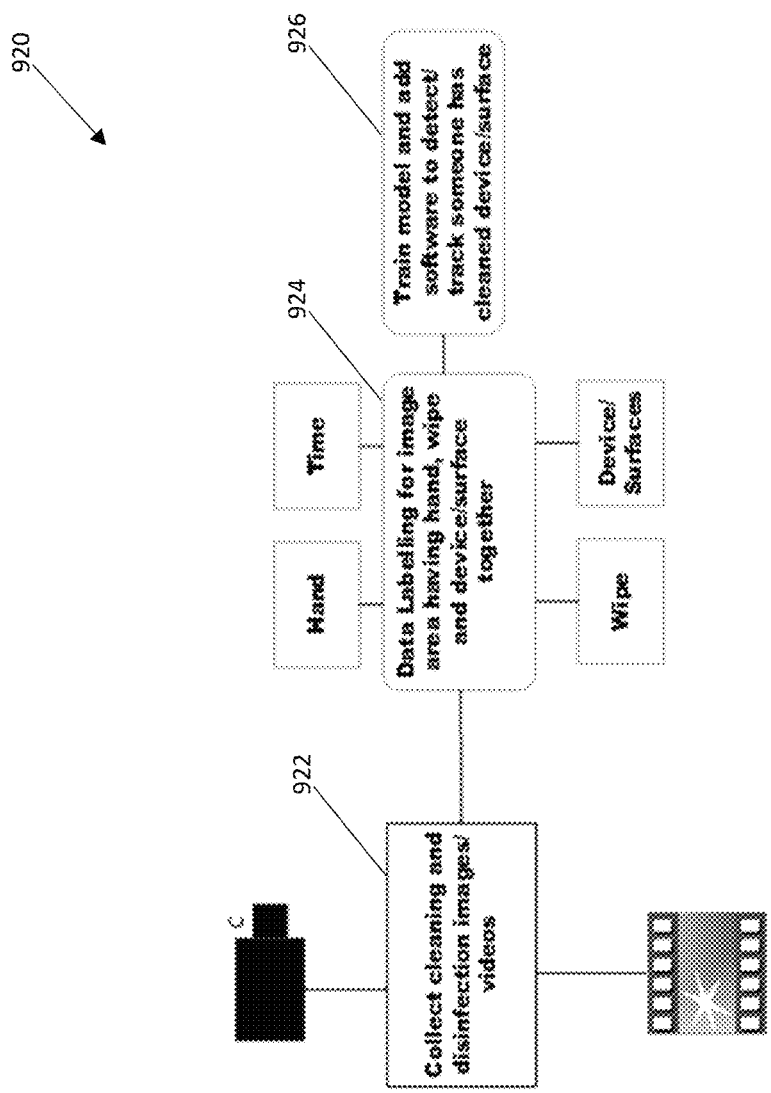
Figure 9C:
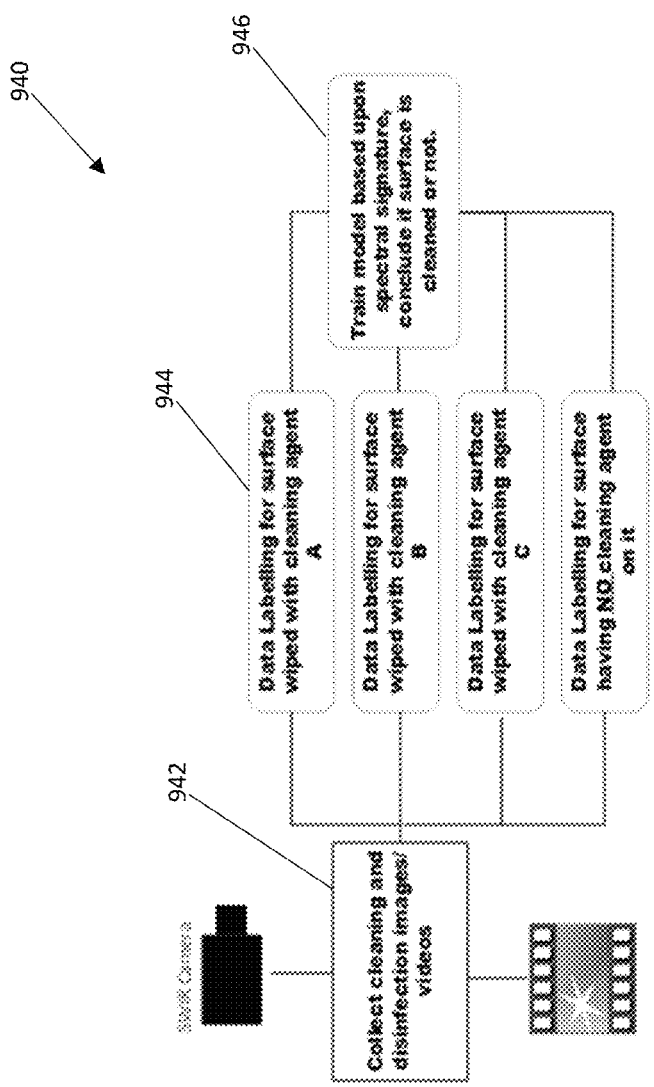

As explained above, one or more machine learning models may be used to detect objects and/or surfaces in a medical room and to detect whether surfaces have been cleaned. FIGS. 9A-9C illustrate exemplary methods for training machine learning models to perform these tasks. FIG. 9A is an exemplary block diagram of a method 900 for training a machine learning model to detect objects and/or surfaces to be cleaned, which could be used, for example, for step 204 of method 200. At step 902, images of objects and/or surfaces are collected. The images include images of medical rooms that include objects and/or surfaces of the type that are desired to be tracked for cleaning. At step 904, the objects and/or surfaces in the images are labeled, such as by using manually defined bounding boxes. The surfaces and/or objects labeled in the images may be the types of surfaces and/or objects that are designated for cleaning according to a predetermined cleaning protocol. At step 906, a machine learning model is trained on the labeled images to identify the objects and/or surfaces in the images. Different models may be trained for different applications. For example, the training data set for a model used for tracking cleaning in a surgical room may be different than the training data set for a model used for tracking cleaning in a non-surgical room, which may require less thorough cleaning than the surgical room.

FIG. 9B is an exemplary block diagram of a method 920 for training a machine learning model to detect cleaning behavior, which could be used for step 206 of method 200 and/or steps 604 and 606 of method 600. At step 922, images and/or video that depict cleaning similar to the types of cleaning performed in medical rooms are collected. At step 924, indicators associated with cleaning are labeled in the imaging. Any suitable indicators of cleaning behaviors in the imaging may be labeled. This can include hands of cleaning personnel, cleaning implements, such as wipes, the surfaces that are being cleaned, and/or labeling associated with the time period in which a surface is being cleaned. At step 926, the machine learning model is trained on the labeled images. Depending on how the machine learning model is trained, the output of the machine learning model could be indications associated with detections of each indicator for one or more regions of interest in imaging, such as described above with respect to steps 604 and 606 of method 600. Alternatively, a machine learning model may be trained to output that a cleaning operation has been detected for a given region of interest (for example, incorporating steps 604, 606, and 608 of method 600 into the functionality of the machine learning model). In some variations, the machine learning model is trained to incorporate a temporal element into detection of cleaning behavior. For example, the machine learning model may be trained to determine that a surface has been cleaned only after a cleaning operation is detected for a given surface for a suitable period of time.

FIG. 9C is an exemplary block diagram of a method 940 for training a machine learning model to detect deposits on surfaces that indicate that the surfaces have been cleaned, which could be used for step 206 of method 200. At step 942, imaging (images and/or video) of surfaces is collected. The imaging was generated using an imaging modality that is capable of detecting the desired cleaning deposits. For example, where the cleaning deposits include a fluorescence imaging agent that fluoresces in the infrared spectrum, fluorescence imaging generated by an infrared fluorescence imaging modality is used, or where the cleaning deposits are detectable using a SWIR imaging modality, SWIR imaging is used. At step 944, surfaces in the imaging are labeled according to the presence or absence of cleaning deposits. Any desired number of cleaning deposits that are captured in the imaging may be labeled. For example, where different cleaning agents may be used that have different spectral signatures, the imaging may be labeled according to the specific cleaning agent—e.g., cleaning agent A, cleaning agent B, cleaning agent C in FIG. 9C. Surfaces without cleaning agent may be labeled as well. At step 946, the machine learning model is trained to identify the spectral signatures of the respective cleaning agents. The machine learning model may be trained to detect the presence of a cleaning agent, according to the types of cleaning agents labeled in the training images, and may optionally be trained to detect the type of cleaning agent as well.

As noted above, different machine learning models may be trained for different applications. For example, the training data set for a model used for tracking cleaning in a surgical room may be different than the training data set for a model used for tracking cleaning in a non-surgical room and/or the training data set for a model used for tracking cleaning after a particular type of medical procedure may be different than the training set for a model used for tracking cleaning after a different type of medical procedure. Alternatively, a machine learning model may be trained for tracking cleaning in multiple types of medical rooms and/or for multiple types of procedures and cleaning tracking system may be configurable by a user for a particular type of medical room and/or medical procedure.

Figure 11:
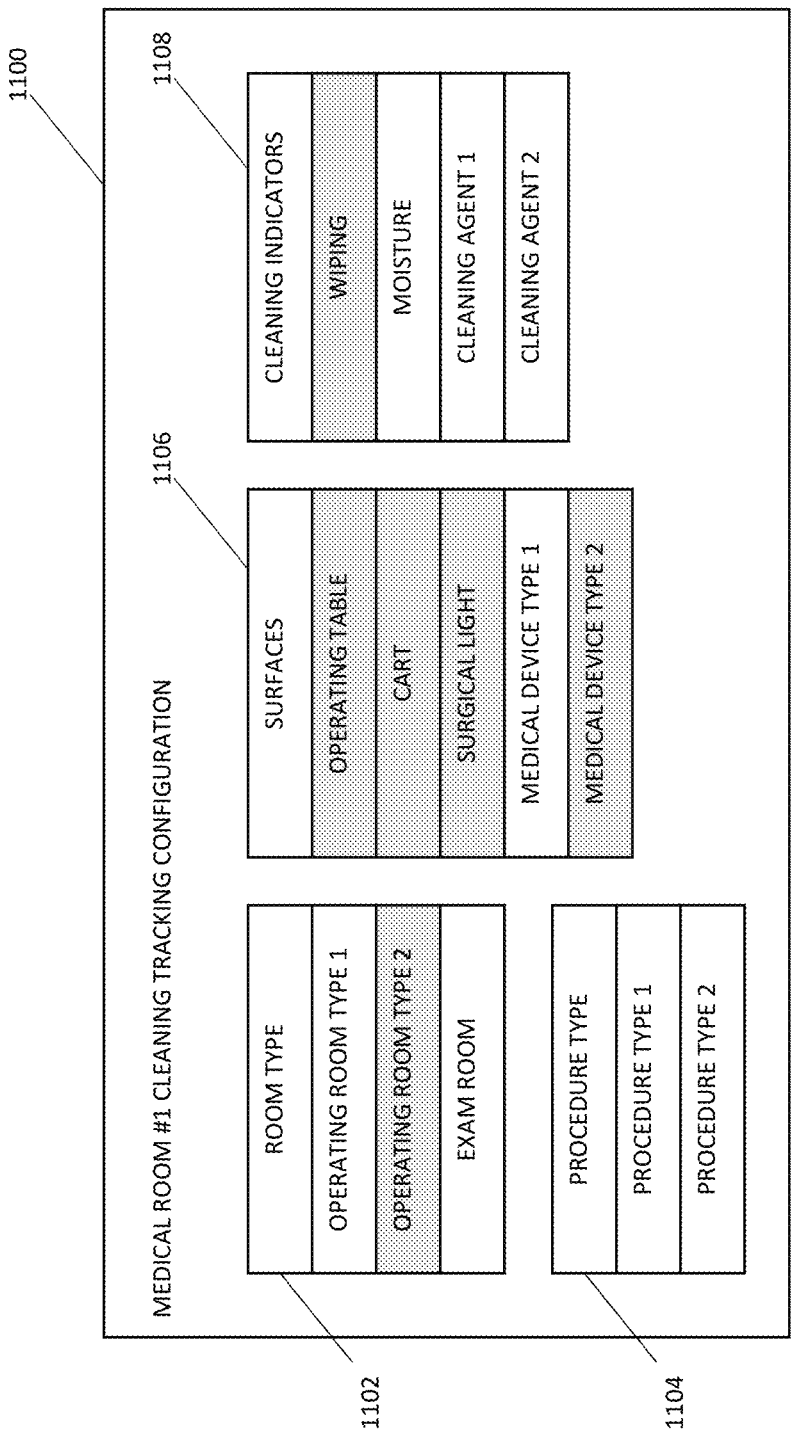
FIG. 11 illustrates an exemplary user interface that a user may use to select a cleaning tracking profile that a cleaning tracking system may use for tracking cleaning in a particular medical room.

A user may set up different cleaning tracking profiles for different medical rooms and may customize each profile by selecting different surfaces to track and/or by selecting different cleaning behaviors to track. For example, computing system 104 and/or remote system 106 may include a system configuration user interface that a user may use to tailor the system for a particular type of medical room and/or a particular type of medical procedure. FIG. 11 illustrates an exemplary user interface 1100 that a user may use to select a cleaning tracking profile that the cleaning tracking system may use for tracking cleaning in a particular medical room ("Medical Room #1). User interface 1100 includes a room type menu 1102 for selecting predefined room type profiles that may define which surfaces are tracked and/or which cleaning behaviors are tracked for the particular medical room. In the illustrated example, "operating room type 2" has been selected. A procedure type menu 1104 may be provided for predefined cleaning protocols associated with different procedure types. A surfaces menu 1106 can enable customization of the surfaces that the system will track for the particular medical room. In the illustrated example, "operating table," "cart," "surgical light," and "medical device type 2" are selected per the "operating room type 2" profile. A user may be able to select and/or deselect surfaces for further customization. User interface 1100 also includes a cleaning indicators menu 1108 that can be used for selecting different cleaning indicators that the system will track. The illustrated example includes "wiping," in which the system will track cleaning behaviors as evidence of cleaning, and "moisture," "cleaning agent 1," and "cleaning agent 2," in which the system will track moisture and/or the two different cleaning agents as evidence of cleaning. In the illustrated example, "wiping" is preselected as part of the operating room type 2 profile and this can be further customized by selecting or deselecting the available cleaning indicators. A user interface such as user interface can be used to set predetermined cleaning tracking profiles for each medical room of a facility.

Figure 10:
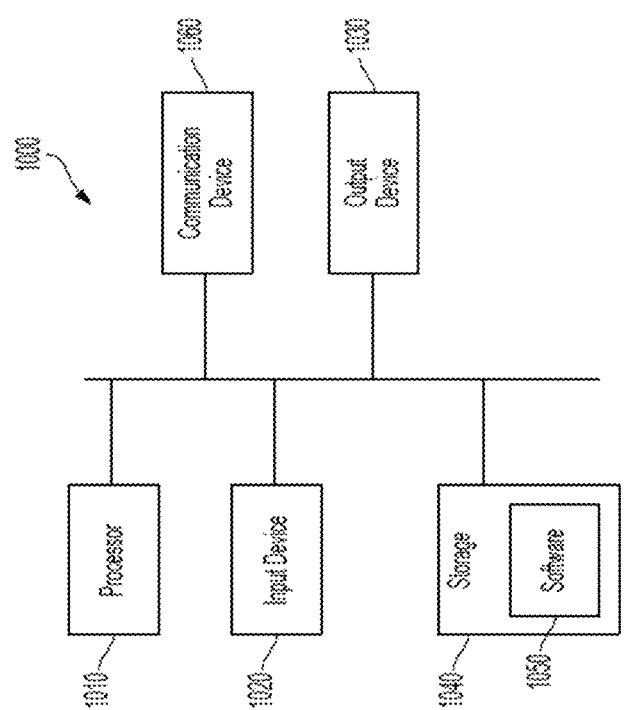
FIG. 10 illustrates an example of a computing system.

FIG. 10 illustrates an example of a computing system 1000 that can be used for one or more of components of system 100 of FIG. 1, such as one or more of camera system 102, computing system 104, and remote system 106. System 1000 can be a computer connected to a network, such as one or more networks of hospital, including a local area network within a room of a medical facility and a network linking different portions of the medical facility. System 1000 can be a client or a server. As shown in FIG. 10, system 1000 can be any suitable type of processor-based system, such as a personal computer, workstation, server, handheld computing device (portable electronic device) such as a phone or tablet, or dedicated device. The system 1000 can include, for example, one or more of input device 1020, output device 1030, one or more processors 1010, storage 1040, and communication device 1060. Input device 1020 and output device 1030 can generally correspond to those described above and can either be connectable or integrated with the computer.

Input device 1020 can be any suitable device that provides input, such as a touch screen, keyboard or keypad, mouse, gesture recognition component of a virtual/augmented reality system, or voice-recognition device. Output device 1030 can be or include any suitable device that provides output, such as a display, touch screen, haptics device, virtual/augmented reality display, or speaker.

Storage 1040 can be any suitable device that provides storage, such as an electrical, magnetic, or optical memory including a RAM, cache, hard drive, removable storage disk, or other non-transitory computer readable medium. Communication device 1060 can include any suitable device capable of transmitting and receiving signals over a network, such as a network interface chip or device. The components of the computing system 1000 can be connected in any suitable manner, such as via a physical bus or wirelessly.

Processor(s) 1010 can be any suitable processor or combination of processors, including any of, or any combination of, a central processing unit (CPU), graphics processing unit (GPU), field programmable gate array (FPGA), and application-specific integrated circuit (ASIC). Software 1050, which can be stored in storage 1040 and executed by one or more processors 1010, can include, for example, the programming that embodies the functionality or portions of the functionality of the present disclosure (e.g., as embodied in the devices as described above). For example, software 1050 can include one or more programs for execution by one or more processor(s) 1010 for performing one or more of the steps of method 200 and/or method 600.

Software 1050 can also be stored and/or transported within any non-transitory computer-readable storage medium for use by or in connection with an instruction execution system, apparatus, or device, such as those described above, that can fetch instructions associated with the software from the instruction execution system, apparatus, or device and execute the instructions. In the context of this disclosure, a computer-readable storage medium can be any medium, such as storage 1040, that can contain or store programming for use by or in connection with an instruction execution system, apparatus, or device.

Software 1050 can also be propagated within any transport medium for use by or in connection with an instruction execution system, apparatus, or device, such as those described above, that can fetch instructions associated with the software from the instruction execution system, apparatus, or device and execute the instructions. In the context of this disclosure, a transport medium can be any medium that can communicate, propagate or transport programming for use by or in connection with an instruction execution system, apparatus, or device. The transport computer readable medium can include, but is not limited to, an electronic, magnetic, optical, electromagnetic, or infrared wired or wireless propagation medium.

System 1000 may be connected to a network, which can be any suitable type of interconnected communication system. The network can implement any suitable communications protocol and can be secured by any suitable security protocol. The network can comprise network links of any suitable arrangement that can implement the transmission and reception of network signals, such as wireless network connections, T1 or T3 lines, cable networks, DSL, or telephone lines.

System 1000 can implement any operating system suitable for operating on the network. Software 1050 can be written in any suitable programming language, such as C, C++, Java, or Python. In various examples, application software embodying the functionality of the present disclosure can be deployed in different configurations, such as in a client/server arrangement or through a Web browser as a Web-based application or Web service, for example.

The foregoing description, for the purpose of explanation, has been described with reference to specific examples. However, the illustrative discussions above are not intended to be exhaustive or to limit the invention to the precise forms disclosed. Many modifications and variations are possible in view of the above teachings. The examples were chosen and described in order to best explain the principles of the techniques and their practical applications. Others skilled in the art are thereby enabled to best utilize the techniques and various examples with various modifications as are suited to the particular use contemplated.

Although the disclosure and examples have been fully described with reference to the accompanying figures, it is to be noted that various changes and modifications will become apparent to those skilled in the art. Such changes and modifications are to be understood as being included within the scope of the disclosure and examples as defined by the claims. Finally, the entire disclosure of the patents and publications referred to in this application are hereby incorporated herein by reference.

The invention claimed is:

1. A method for monitoring cleaning of a medical room comprising:
   receiving imaging of the medical room, the imaging capturing signatures of cleaning deposits on one or more surfaces of the medical room deposited via a cleaning process;
   analyzing the imaging to:
      identify one or more surfaces in the medical room that should be cleaned, and
      determine which of the one or more surfaces have been cleaned by identifying the signatures of the cleaning deposits; and
   displaying an indication of at least one of: (1) the surfaces that have been cleaned, and (2) one or more surfaces that have not been cleaned.

2. The method of claim 1, wherein the signatures of cleaning deposits are fluorescence signatures.

3. The method of claim 1, wherein the imaging comprises fluorescence imaging.

4. The method of claim 3, wherein the imaging comprises visible light imaging.

5. The method of claim 1, wherein the imaging was captured by at least one room mounted camera.

6. The method of claim 1, wherein the cleaning deposits were deposited by at least one wipe that comprises a fluorescence imaging agent.

7. The method of claim 1, wherein analyzing the imaging to determine which of the one or more surfaces have been cleaned comprises identifying the one or more surfaces according to a cleaning protocol.

8. The method of claim 1, wherein the signatures of cleaning deposits comprise moisture signatures.

9. The method of claim 8, wherein the imaging comprises short-wave infrared (SWIR) imaging.

10. A system comprising one or more processors, memory, and one or more programs stored in the memory for execution by the one or more processors for:
    receiving imaging of the medical room, the imaging capturing signatures of cleaning deposits on one or more surfaces of the medical room deposited via a cleaning process;
    analyzing the imaging to:
       identify one or more surfaces in the medical room that should be cleaned, and
       determine which of the one or more surfaces have been cleaned by identifying the signatures of the cleaning deposits; and
    transmitting data to at least one display for displaying an indication of at least one of: (1) the surfaces that have been cleaned, and (2) one or more surfaces that have not been cleaned.

11. The system of claim 10, comprising at least one room mounted camera for generating the imaging.

12. The system of claim 11, comprising at least one room mounted fluorescence excitation light source.

13. The system of claim 12, wherein at least one medical light for illuminating a patient during a medical procedure comprises the at least one room mounted fluorescence excitation light source.

14. A method for monitoring cleaning of a medical room comprising:
    receiving imaging of the medical room;
    analyzing the imaging to:
       identify one or more surfaces in the medical room that should be cleaned, and
       detect performance of one or more cleaning behaviors by personnel cleaning the one or more surfaces in the medical room;
    determining which surfaces have been cleaned based on correlating the detected one or more cleaning behaviors with the one or more surfaces; and
    displaying at least one indication of at least one of: (1) the surfaces that have been cleaned, and (2) at least one of the one or more surfaces that have not been cleaned.

15. The method of claim 14, wherein at least one machine learning model is used to detect performance of the one or more cleaning behaviors.

16. The method of claim 15, wherein the at least one machine learning model is configured to detect a hand grasping a cleaning implement.

17. The method of claim 14, wherein the one or more surfaces in the medical room are identified using a first machine learning model and performance of the one or more cleaning behaviors is detected using a second machine learning model that is different than the first machine learning model.

18. The method of claim 17, wherein the performance of the one or more cleaning behaviors is detected using at least one sensor sensing contact with the one or more surfaces in addition to using the second machine learning model.

19. The method of claim 14, wherein determining which surfaces has been cleaned comprises determining that a cleaning procedure has been performed for a threshold amount of time.

20. The method of claim 14, wherein the imaging comprises imaging from multiple cameras.

21. The method of claim 14, wherein the at least one indication comprises a textual indication.

22. The method of claim 14, wherein the at least one indication is provided in an image of the medical room.

23. The method of claim 22, wherein the at least one indication comprises a visual indicator displayed in association with a surface in the image.

24. The method of claim 23, wherein the visual indicator comprises at least one of outlining of the surface and coloring of the surface.

25. The method of claim 14, wherein the one or more surfaces in the medical room that should be cleaned are identified at least in part based on detecting touching of the one or more surfaces by people during a medical procedure.

26. The method of claim 14, comprising, for a respective surface to be cleaned, providing a first visual indication in an image of the medical room that the surface should be cleaned, and replacing the first visual indication with a second visual indication upon detecting that the respective surface has been cleaned.

27. A system comprising one or more processors, memory, and one or more programs stored in the memory for execution by the one or more processors for:
    receiving imaging of the medical room;
    analyzing the imaging to:
       identify one or more surfaces in the medical room that should be cleaned, and
       detect performance of one or more cleaning procedures by personnel cleaning the one or more surfaces in the medical room;
    determining which surfaces have been cleaned based on correlating the detected one or more cleaning procedures with the one or more surfaces; and
    transmitting data to at least one display for displaying at least one indication of at least one of: (1) the surfaces that have been cleaned, and (2) at least one of the one or more surfaces that have not been cleaned.

\* \* \* \* \*